(12) United States Patent
Allen et al.

(10) Patent No.: US 7,685,349 B2
(45) Date of Patent: Mar. 23, 2010

(54) MODULES AND BACKPLANES

(75) Inventors: Brian Allen, Spokane Valley, WA (US); Terry Thom, Greenacres, WA (US); Richard Garrett, Greenacres, WA (US)

(73) Assignee: Telect Inc., Liberty Lake, WA (US)

( * ) Notice: Subject to any disclaimer, the term of this patent is extended or adjusted under 35 U.S.C. 154(b) by 402 days.

(21) Appl. No.: 11/243,921

(22) Filed: Oct. 5, 2005

(65) Prior Publication Data
US 2006/0277342 A1    Dec. 7, 2006

Related U.S. Application Data

(60) Provisional application No. 60/687,629, filed on Jun. 3, 2005.

(51) Int. Cl.
H05K 7/10 (2006.01)
H05K 7/14 (2006.01)

(52) U.S. Cl. .................. 710/302; 710/301; 361/796

(58) Field of Classification Search ......... 710/301–302; 361/796
See application file for complete search history.

(56) References Cited

U.S. PATENT DOCUMENTS

| | | |
|---|---|---|
| 4,247,882 A | 1/1981 | Prager et al. |
| 4,337,499 A | 6/1982 | Cronin |
| 5,175,662 A | 12/1992 | DeBalko et al. |
| 5,233,501 A | 8/1993 | Allen et al. |
| 5,303,116 A | 4/1994 | Grotz |
| 5,367,569 A | 11/1994 | Roach et al. |
| 5,371,648 A | 12/1994 | Bonvallat |
| 5,436,800 A | 7/1995 | Maruska et al. |
| 5,438,617 A * | 8/1995 | Hill et al. ............ 379/327 |
| 5,539,801 A | 7/1996 | Herh et al. |
| 5,546,282 A * | 8/1996 | Hill et al. ............ 361/796 |
| 5,596,569 A | 1/1997 | Madonna et al. |
| 6,034,926 A | 3/2000 | Dang et al. |
| 6,215,668 B1 | 4/2001 | Hass et al. |
| 6,283,773 B1 | 9/2001 | Price et al. |
| 6,707,686 B2 * | 3/2004 | Fritz et al. .......... 361/796 |
| 6,709,292 B1 * | 3/2004 | Barefoot .............. 439/607 |
| 6,760,229 B2 | 7/2004 | Roscoe et al. |
| 6,816,388 B2 | 11/2004 | Junkins et al. |
| 6,822,876 B2 * | 11/2004 | Goergen ............. 361/788 |
| 7,170,753 B2 | 1/2007 | Campini |
| 7,416,349 B2 | 8/2008 | Kramer |
| 2001/0011314 A1 | 8/2001 | Gallagher et al. |
| 2002/0140433 A1 | 10/2002 | Lawson et al. |
| 2002/0176681 A1 | 11/2002 | Puetz et al. |
| 2003/0012362 A1 | 1/2003 | Khemakhem et al. |
| 2004/0141521 A1 | 7/2004 | George |
| 2005/0050272 A1 * | 3/2005 | Behrens et al. ........ 711/114 |
| 2005/0152106 A1 | 7/2005 | Coster et al. |

* cited by examiner

*Primary Examiner*—Mark Rinehart
*Assistant Examiner*—Jeremy S Cerullo
(74) *Attorney, Agent, or Firm*—Lee & Hayes, PLLC

(57) ABSTRACT

Embodiments of a module and backplane are presented herein.

15 Claims, 12 Drawing Sheets

MODULES AND BACKPLANES

RELATED APPLICATIONS

The present application claims priority under 35 U.S.C. § 119 to U.S. Provisional Application Ser. No. 60/687,629 filed Jun. 3, 2005, to Garrett et al., and titled "Cable Module and Backplanes", the disclosure of which is hereby incorporated by reference in its entirety.

TECHNICAL FIELD

The present invention generally relates to the field of telecommunications and more particularly relates to a digital cross connect cable connection system for use in the telecommunications industry, including modules, panels and frameworks for use in telecommunications equipment. The digital cross connect or DSX cable connection system applies to individual cables being connected to any type of equipment, as well as to the plurality of connectors, modules or panels utilizing such connections.

BACKGROUND

Digital signal cross-connect equipment plays a vital role in the installation, monitoring, testing, restoring and repairing digital telecommunication networks. Digital signal cross-connect modules are frequently used in digital networks to provide a central cross-connect location that is convenient for testing, monitoring, restoring and repairing infrastructure equipment associated with the communication of digital signals. Digital signal cross-connect modules are frequently used in a variety of locations, such as telephone central offices, remote sites and customer premises.

Currently, digital signal cross-connect modules provide access to a single circuit at a time to perform testing, monitoring, patching and repairing. This is accomplished using a dedicated single access module or a removable module capable of being interchanged to access multiple circuits. Single access modules are limited to accessing a single circuit from a dedicated location and thus an individual module is required for each circuit, thereby increasing cost and sacrificing density. Density as used herein refers to the number of circuits that may be connected to a piece of telecommunications equipment such as a panel per unit of size. For example, a panel of a given size that may connect to more circuits will have a greater circuit density than a panel of the same size that connects to fewer circuits.

Removable modules may be utilized with multiple circuits by physically removing them from one location and installing the module in another location to access another circuit. However, while a removable module may provide access to multiple circuits, multiple access points are still required, thereby limiting density.

Thus, current single access dedicated modules, removable modules, panel systems and backplanes may inhibit efficiency in space management, limit attainable density, and increase cost.

SUMMARY

Modules and backplanes are described which are configured to permit access to a plurality of telecommunications circuits from a single access point in a telecommunication chassis. For example, a chassis may include a backplane having two or more interfaces, wherein each interface is connectable to at least two telecommunications circuits. A module may be inserted into the chassis in one or more access point. In the one or more access point of the chassis the module may connect to one or more of said interfaces such that the module provides access to at least two telecommunications circuits from the one access point.

Further, backplanes are described which may be operable with or without insertable modules. For example, a backplane providing connections to form a plurality of telecommunications circuits may be formed having a single substrate, e.g. a single printed circuit board (PCB). One or more insertable module may be connected to the backplane to provide access to the telecommunications circuits formed using the backplane. Thus, a module may be connected to the backplane to access one or more telecommunications circuits, for instance, by inserting the module into an access point of a chassis having the backplane. The backplane is operable to permit signals flow through the plurality of said telecommunications with the module connected or without receiving the insertable module. Continuity of the signal flow is maintained while modules are being inserted or removed from the chassis (e.g. connecting and disconnecting from the backplane).

BRIEF DESCRIPTION OF THE DRAWINGS

The same reference numbers are utilized in instances in the discussion to reference like structures and components.

DETAILED DESCRIPTION

Figure 1:
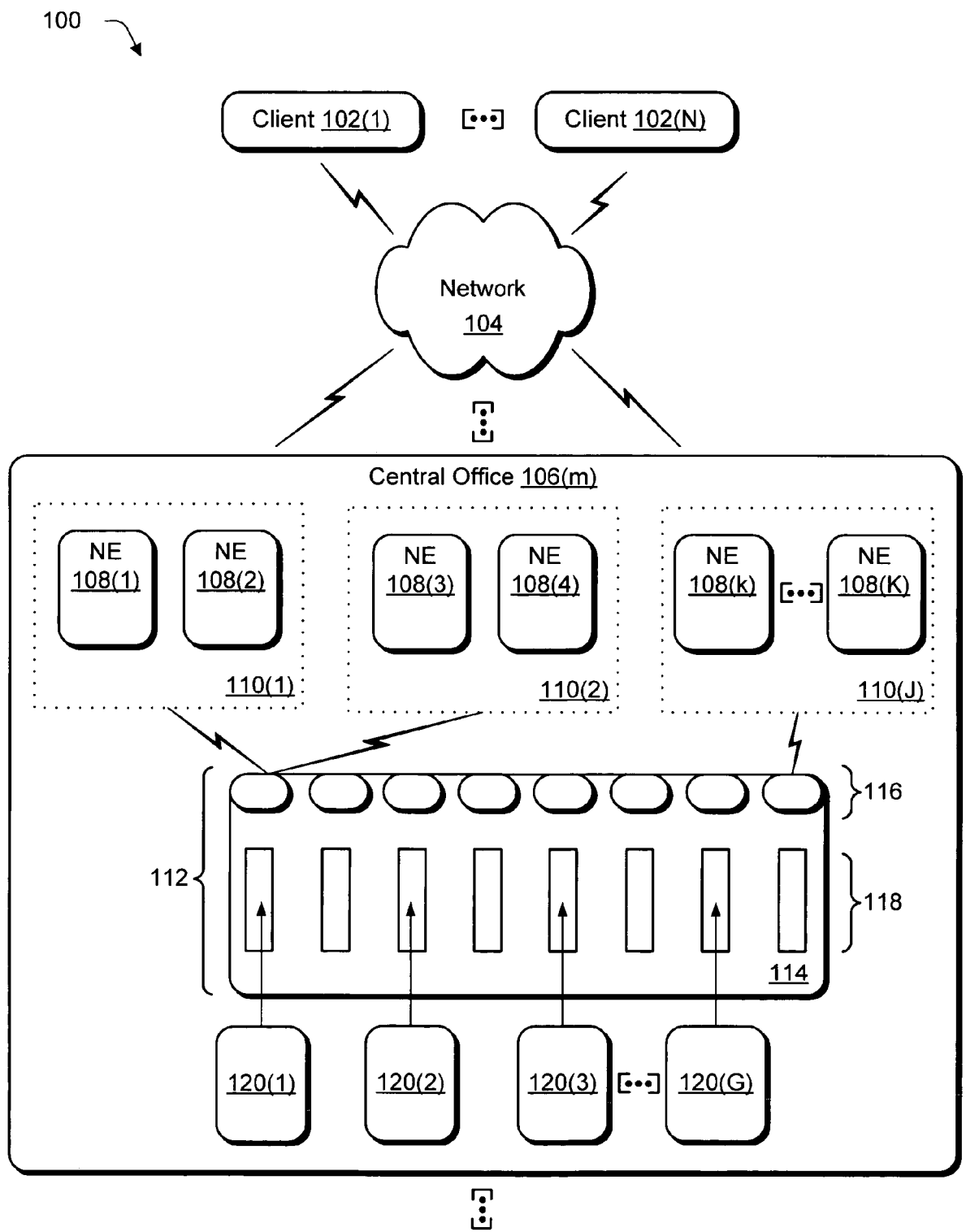
FIG. 1 is an illustration of a telecommunications environment in an exemplary implementation in which a module of the present invention may operate.

FIG. 1 illustrates an exemplary implementation of an environment 100 operable to provide a telecommunications network in which cross-connect panels and modules are employed. The environment 100 depicts a plurality of clients 102(1), . . . , 102(N) which are communicatively coupled, one to another, via a network 104. Clients may be implemented in a wide variety of ways, including users such as consumers, business users, internal users in a private network, and other types of users that use telecommunications signals or transmit and receive telecommunications signals. Additionally, for purposes of the following discussion clients 102(1)-102(N) may also refer to client devices and software which are operable to transmit and receive telecommunications signals. Thus, clients 102(1)-102(N) may be implemented as users, software and devices.

The environment is illustrated as including a central office 106(m), where "m" can be any integer from one to "M". Thus, the central office 106(m) is representative of any number of such central offices which may exist within the environment 100. Further, it will be appreciated that the equipment and functions indicated in FIG. 1 occurring within central office 106(m) may be located and performed at alternate locations within the environment 100 such as remote sites, outside plant sites, client sites, customer sites or other locations. Therefore, the Central office 106(m) as used herein is representative of a site in which the panels and modules may be employed.

The central office 106(m) is illustrated in FIG. 1 as having a variety of network elements (NE) 108(1)-108(K) that are interconnected via the central office 106(m). Network elements 108(1)-108(K) may be implemented in a variety of ways. For example, the network elements 108(1)-108(K) may be configured as switches, digital cross connect system (DCS), telecommunication panels, digital radios, fiber optic equipment, network office terminating equipment, and any other telecommunication equipment or devices employed in a telecommunications infrastructure.

The network elements 108(1)-108(K), when connected one to another, form a plurality of telecommunication circuits 110(1)-110(J). Thus, the telecommunications circuits 110(1)-110(J) are representative of an interconnection (e.g., cross-connection) of at least two NEs 108(1)-108(K). As should be apparent, while the NEs 108(1)-108(K) are illustrated within the central office 106(m) to depict the interconnection of the NEs 108(1)-108(K) provided by the central office 106(m), NE's 108(1)-108(K) may also located apart from (e.g., "outside") the central office 106(m). For example, the NE 108(1)-108(K) may be located at an outside plant location, a client location, or another remote site in the environment 100. Thus, telecommunications circuits accordingly may be formed entirely within the central office 106(m) or between locations such that one or both of the NEs 108(1)-102(2) are located at different sites.

The environment 100 is also illustrated as having a cross-connect panel 112. The cross-connect panel 112 may provide a variety of functionality. For instance, the NEs 108(1)-108(K) in the environment 100 may be terminated at cross-connect panel 110. Further, a plurality of network elements (e.g., NEs 108(k), 108(K)) may be interconnected to form telecommunications circuits (e.g., telecommunications circuit 110(J)) using the cross-connect panel 112. Like the NEs 108(1)-108(K), the cross-connect panel may be located in a variety of places within the envirionment 100, such as within the central office 106(m) as illustrated in FIG. 1, at a customer site, and so on. Further, although a single cross connect panel 112 is illustrated in FIG. 1 for the sake of clarity of the figure, it should be appreciated that a plurality of such panels may be provided throughout the environment 100. Cross-connect panels such as panel 112 provide modular access to a plurality of circuits such as circuits 108(1) to 108(n) in FIG. 1.

The cross-connect panel 112 includes a chassis 114 having a plurality of interfaces 116. The interfaces 116 provide connection points or terminations for the inputs and outputs of NE's 108(1)-108(K) in respective telecommunication circuits 110(1)-110(J). Thus, the plurality of telecommunications circuits 110(1)-110(J), each connecting two or more network elements, are formed through the interfaces 116.

Chassis 114 further has a plurality of access points 118 Each of access points 118 of chassis 114 is arranged at a location corresponding to one or more of the interfaces 116. The access points 118 are configured to allow connections to be made using the interfaces 116. For example, one or more of a plurality of modules 120(1)-120 may be configured for insertion into the chassis 114 via one or more of the access points 118 to provide access to circuits 110(1)-110(J) connected to a corresponding interface 116. For example, an insertable telecommunications module may be sequentially inserted into the chassis 114, such that at one time the device is in one particular slot and at another time the device is in another distinct slot. In this manner, access may be provided at a particular interface 116 to the circuits 110(1)-110(J) corresponding to the respective interface. The access points 118 may be configured in a variety of ways to accept modules, such as a series of slots in the chassis 114 that receive insertable modules. In an implementation, the number of access points provided is a multiple of eight.

Telecommunications modules 120(1)-120(G) (hereinafter "modules") are configured such that each module 120(1)-120(G) may access a respective on of the plurality of circuits 110(1)-110(G) from a respective one of the access points 118. For example, module 120(1) may be inserted into an access point 118 to access the interface 118 corresponding to the access point 118 such that the module 120(1) provides simultaneous access to the inputs and/or outputs of at least two telecommunications circuits (e.g., telecommunications circuits 110(1), 110(2)).

The cross-connect panel 112 may be configured to receive a plurality of the modules 120(1)-120(G), which may be configured the same or different, such that each of the modules 120(1)-120(G) is connectable to access two or more of the plurality of telecommunications circuits 110(1)-110(J) when inserted into a single access point 118 in the panel. As illustrated in FIG. 1, for instance, module 120(2) is insertable into chassis 114 to provide access to the inputs and/or outputs of at least two of the telecommunications circuits 110(1)-110(J), in the same manner as module 120(1).

Figure 2A:
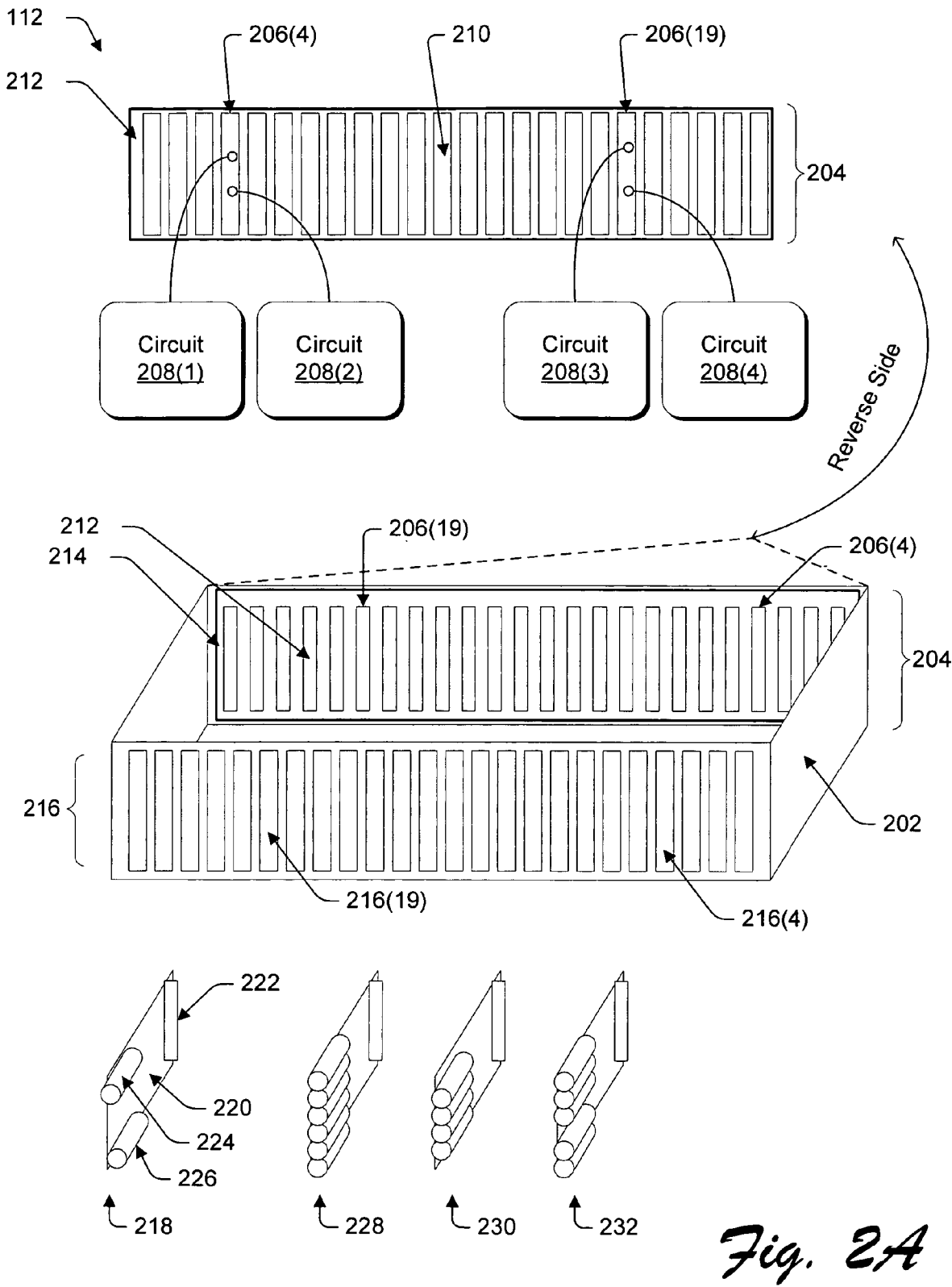
FIG. 2A is an exemplary arrangement of telecommunications panel showing connections to circuits and modules configured to access multiple circuits using a single insertion point of the panel.

FIG. 2A illustrates an exemplary implementation showing the cross-connect panel 112 of FIG. 1 in greater detail. Cross connect panel 112 includes a chassis 202, which may be the same as or different from chassis 114, and therefore new reference numbers will be utilized in discussion of this figure different than those used for FIG. 1. Chassis 202 has a backplane 204 and a plurality of interfaces 206 (e.g., interfaces 206(4), 206(19)) that are arranged on the backplane 204. Backplane 204 may be formed from a substrate, such as a printed circuited board. Each of interfaces 206 may connect to at least two telecommunications circuits 208. For example, in FIG. 2A Interface 206(4) is connected to circuit 208(1) and circuit 208(2). Likewise, Interface 206(19) is connected to circuit 208(3) and circuit 208(4). Each of the interfaces 206 may be similarly configured to connect to two or more telecommunications circuits. Further, as mentioned each circuit may include a plurality of NE's.

Each interface 206 includes a set of rear connectors 210 coupled through the backplane 204 to a corresponding one of a plurality of backplane connectors 212. For example, in FIG. 2A, chassis 202 has a plurality of sets of rear connectors 210 and a plurality of backplane connectors 212. The backplane connectors 212 are physically and communicatively coupled to the corresponding set of rear connectors 210 through the substrate of the backplane 204. Thus, each of the interfaces 206 may include a backplane connector 212 and a corresponding set of rear connectors 210, e.g., terminations.

Figure 2B:
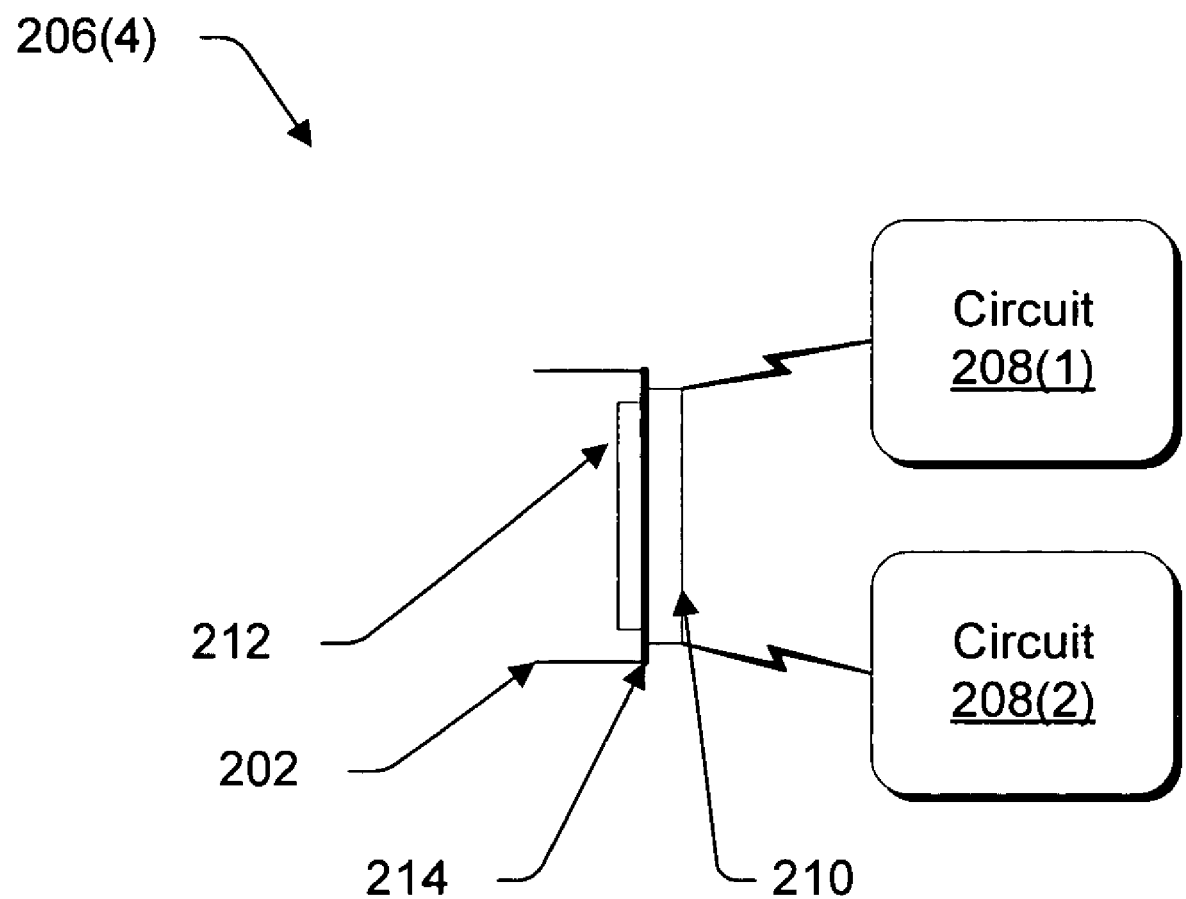
FIG. 2B is an illustration of a side on view of an interface of a telecommunication panel depicted in FIG. 2A in greater detail.

Reference will now be made to FIG. 2B, in which, a side on view of the interface 206(4) of FIG. 2A is illustrated. Interface 206(4) has backplane connector 212 mounted on a substrate 214 of the backplane 204 of FIG. 2A. A set of rear connectors 210 are mounted on another side of the substrate 214. The set of rear connectors 210 is configured to connect to at least two circuits, such as circuits 208(1) and 208(2) as illustrated in FIG. 2B.

Reference will now be made again to FIG. 2A, the chassis 202 includes a plurality of access points 216 (e.g., access points 216(4) and 216(19)). The number of access points within the chassis 202 may be more or less as may be required for a particular application. As previously described, the access points 216 provide a location where a connection may be made to the interfaces 206 through the chassis 202. For example, access point 216(4) is illustrated in FIG. 2A as having a corresponding interface such as 206(4). Thus, access point 216(4) may provide a connection to the interface 206(4) and to the corresponding circuits 208(1) and 208(2) connected to interface 206(4).

A module (e.g., module 218), when inserted at an access point 216 corresponding to an interface 206, engages the corresponding backplane connector 212. The module 218 then may provide access to one or more signals of telecommunication circuits connected to the interface, for example a telecommunication circuit connected using rear connectors 210.

The set of rear connectors 210 may be configured in a variety of ways. For example, the rear connectors 210 may be configured as Bayonet Neill-Concelman (BNC) type connectors, 1.5/5.6 type connectors, 1.0/2.3 type connectors and so on. Naturally, other connectors suitable for making telecommunications connections may also be employed. In an implementation, the sets of rear connectors 210 may have one or more of an input, output, input cross, and output cross for each circuit that will be connected to the panel at a respective interface. Thus, a set of rear connectors 210 configured to connect at least to two circuits may have eight individual rear connectors 210, such as BNC type connectors. It should also be noted that a set of rear connectors may include subsets of rear connectors that correspond to individual circuits. For example, a set of rear connectors may have an input and an output corresponding to a first circuit, and an input and output corresponding to a second circuit connected to the interface. In this example, the set of four rear connectors would have two subsets of two connectors each corresponding to a different circuit.

The backplane connectors (e.g., backplane connector 212) may also be configured in a variety of ways, such as a pin type connector; a receptor for a card edge type connector or other type of connector that is suitable for making telecommunications connections. The backplane connector 212 may also be integrated into the substrate 214 of the backplane 204 (e.g., a printed circuit board) such that a physical and communicative connection between the module 218 and the substrate 214 is achieved when the module 218 is inserted in a corresponding access point. In this way, a connection is provided between the module 218 and the corresponding rear connectors 210 and circuits (e.g., circuit 208(1)-208(4)) formed using the rear connectors 210.

The rear connectors 210 may be arranged on an exterior surface of the substrate 214 and the backplane connectors 212 arranged on the opposite side of the substrate 214. For example, the backplane connectors may be arranged in the interior of the chassis 202 to mate with the module 218 when inserted in the chassis 202. The rear connectors 210 may provide a connection (e.g., a termination, interconnection, and cross-connection point) for the plurality of network elements (e.g., NEs 108(1)-108(K) of FIG. 1) that make up at least a portion of the telecommunications circuits.

In an implementation, the connections between the rear connectors 210 and network elements may be made without a corresponding module (e.g., module 218) being present in the chassis 202. Thus, the backplane 204 may allow for pre-wiring of the circuits and operation before various modules are placed in the chassis 202 or without modules.

The rear connectors 210 may be arranged in a variety of ways, such as in an array of columns across an exterior surface of the backplane 204. The corresponding backplane connectors 212 may also be arranged on an opposing side of the backplane 204, with each corresponding to a single access point (e.g., slot) in the chassis 202. Naturally, a variety of alternate arrangements are also contemplated. Thus, cross-connect panel 112 may be connected to a plurality of telecommunications circuits through the interfaces 206 and may provide access to two or more telecommunications circuits from single access points within the chassis.

As previously described, the module 218 may be configured in a variety of ways, such as to access a plurality of telecommunications circuits using a single access point 216 of the chassis 202. As illustrated in FIG. 2A, module 218 has a module substrate 220 (e.g., a printed circuit board) and a module interface 222. Module 218 also includes a plurality of jacks (e.g., jacks 224, 226) which are mounted on an end of the substrate 220. The plurality of jacks 224-226 is communicatively coupled to the module interface 222 through the module substrate 220.

Each of the jacks may be configured in a variety of ways, such as an input jack, an output jack, and a monitor jack. Jacks may also be input-cross or output-cross jacks. At least two sets of jacks each having one or more individual jacks may be included on the module. A first set of jacks, (e.g., jack 224) is configured to access a first telecommunications circuit. A second set of jacks (e.g., jack 226) is configured to simultaneously access a second telecommunications circuit. Access as used herein includes monitoring, testing, patching, redirecting, cross-connecting, interconnecting, or otherwise utilizing the circuits or signals from the circuits. Access may be intrusive or non-intrusive. The first and second sets of jacks 224, 226 may provide concurrent access to respective circuits while the module is inserted in a single access point of the chassis. For example, jack 224 may be a monitor jack configured to monitor a signal of one circuit and jack 226 may be another monitor jack configured to monitor a signal of another circuit. The number and function of jacks included on a module such as module 218 may vary. For example, a module configured to access a plurality of circuits may have at least one jack to access a first circuit and at least one other jack to access a second circuit.

In the illustrated implementation, module 218 may be inserted into the chassis 202 using any one of the access points 216. When inserted at any access point (e.g., access points 216) configured to receive the module 218, module interface 222 engages or mates with the corresponding interface 206 to provide a physical and communicative coupling to the interface 206 and accordingly to the circuits 208 attached or formed at the interface 206. In this example, module interface 222 may engage or mate with backplane connector 212 to create a connection to the interface 206. Module 218, when inserted in chassis 202, causes the module interface 222 to engage one of the backplane connectors 212. Each of the backplane connectors 212 has a corresponding set of rear connectors 210 which is configured for use with a plurality of telecommunications circuits. Thus, module 218 may be simultaneously connected to a plurality of telecommunications circuits while engaged with a single backplane connector. The backplane connector 212 may further correspond to a particular access point 216 or slot within the chassis 202. Thus, the module may provide access to the plurality of telecommunications circuits while inserted into a single access point or slot within the panel.

In another implementation, a backplane connector 212 may include two or more individual connectors simultaneously connectable to a single module such as module 218. Each individual connector in the backplane connector will correspond to at least one subset of rear connectors in the entire set of rear connectors to which the backplane connector corresponds. Each subset of the rear connectors may connect to a telecommunications circuit. Accordingly, a module simultaneously coupled to a plurality of individual connectors making up a backplane connector 212 may have access to multiple telecommunications circuits formed by cross-connected or interconnected network elements using the corresponding set of rear connectors.

In a further example, module 218 may be inserted in access point 216(4) of the chassis 202. Access point 216(4) corresponds to interface 206(4). Interface 206(4) is connected to circuits 208(1) and 208(2). Further, interface 206(4) includes a set of rear connectors 210 and a backplane connector 212 physically and communicatively coupled through the backplane substrate 214, one to another. Module connector 222, when sufficiently inserted in access point 216(4), engages backplane connector 212 corresponding to access point 216(4). Module 218 has a first set of jacks (e.g., jack 224) configured to access one of circuits 208(1) and 208(2). Module 218 has a second set of jacks (e.g., jack 226) configured to access another of circuits 208(1) and 208(2). Thus, module 218 inserted at access point 216(4) provides concurrent access to both circuits 208(1) and 208(2). Likewise, module 218 may be inserted into access point 216(19) corresponding to interface 206(19) to provide concurrent access to corresponding circuits 208(3) and 208(4).

In addition to Module 218, FIG. 2A depicts a variety of other embodiments of modules 228, 230 and 232. Modules 228-232 are depicted having six, four, and five individual jacks, respectively. It is contemplated that the number of individuals jacks may be varied as desired for a particular application or customer and is not limited to the specific numbers depicted. Additionally, a set of jacks as described previously may include one or more individual jacks. For example, each set of jacks may be configured to access a particular circuit. The number of jacks included in each set may vary according to a particular application, customer and/or functionality of the particular circuit. The number of jacks designated for each individual circuit may or may not be equal. For example, Module 228, which is depicted as having six total jacks, may have a first set of two jacks to access a first circuit, and a second set of four jacks to access a second circuit. Alternatively, the plurality of jacks depicted with Module 228 may be divided such that three jacks form a set and each set of three accesses a different circuit. Naturally other combinations of jacks and sets of jacks may be employed to produce a variety of different embodiments of a module that is configured to access a plurality of circuits from a single access point in a telecommunications panel.

The chassis 202 may also be configured in a variety of ways. For example, the access points 216 of the chassis may be implemented as a plurality of adjacent slots, each of which corresponds to a respective backplane connector. A module may also be inserted into one such slot and is capable of accessing at least two telecommunications circuits from the single slot as previously described.

In one configuration of cross connect panel 112, a plurality of identically configured modules, such as a module 218, may simultaneously occupy distinct access points 216 in the chassis 202 such that one module is capable of accessing at least two telecommunications circuits using a respective access point 216, while each other module is simultaneously capable of accessing at least two telecommunications circuits using respective access points 216. Additionally, a particular module (e.g., module 218) may be inserted sequentially into at least two such slots and is capable of accessing at least two telecommunications circuits from each slot.

Optionally, one or more module capable of accessing at least two telecommunications circuits using a single slot may be insertable into the chassis 202 along with one or more other modules that are configured differently. Thus a module configured to access at least two telecommunications circuits using a single slot may be found in a panel or chassis with other types of modules.

Figure 3:
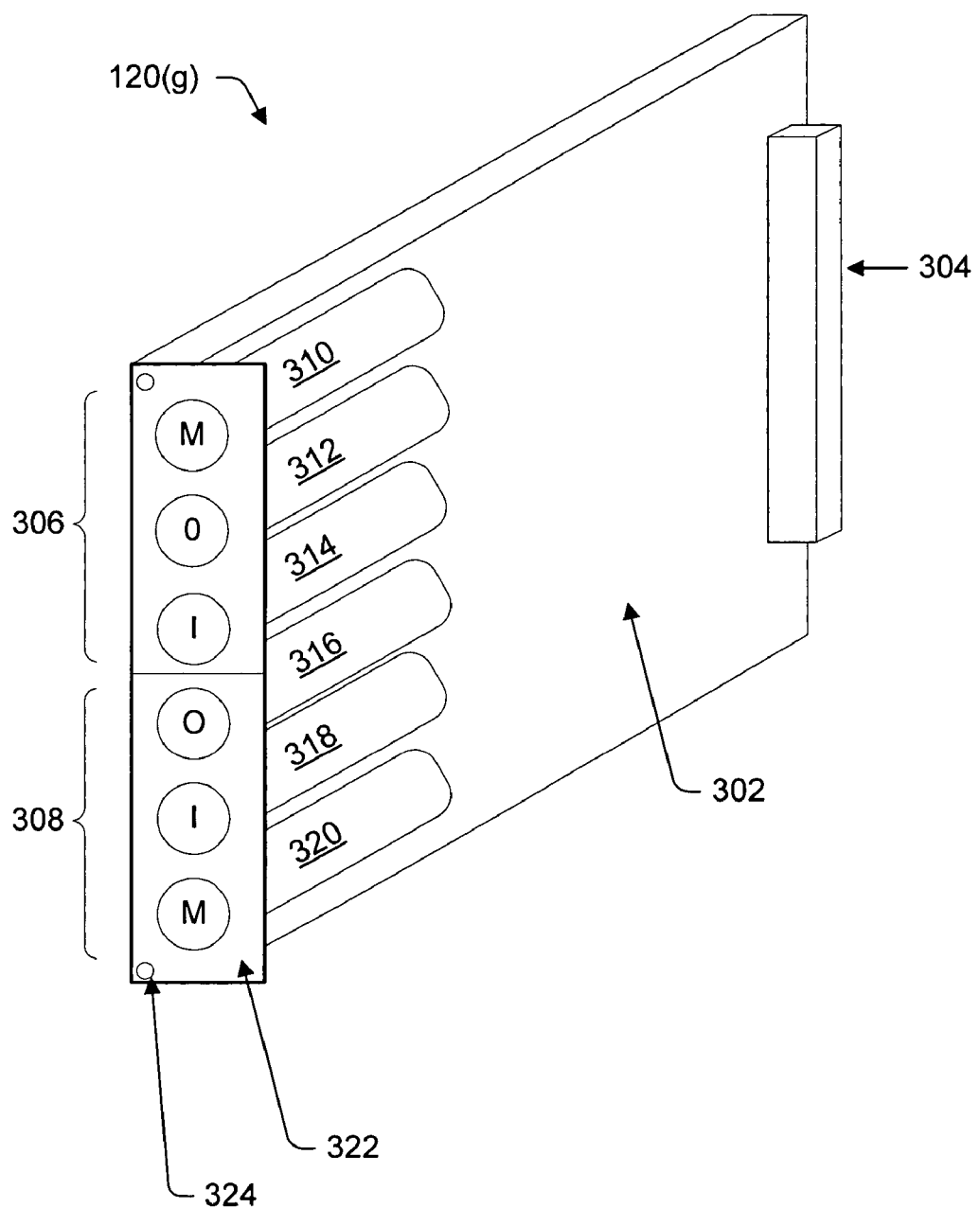
FIG. 3 is illustration of an exemplary module configured to access multiple circuits using a single insertion point of a panel.

FIG. 3 illustrates an exemplary implementation of a module 120(g) (which may be representative of any one of the modules 120(1)-120(G) of FIG. 1. Module 120(g) may be insertable into a panel or chassis as previously described. Module 120(g) includes a substrate 302, such as a printed circuit board, a module interface 304 (e.g., a module connector), and two sets of jacks 306, 308. The sets of jacks 306-308 each include a subset of the plurality of jacks 310-320 that are available on the module 120(g). Each set 306, 308, for instance, may include a monitor, an input and an output. Thus, FIG. 3 shows set 306 includes a monitor jack 310, output jack 312 and input jack 314 and set 308 is shown with output jack 316, input jack 318 and monitor jack 320. The monitor jacks 310, 320 of the first set 306 and second set 308 are configured to provide concurrent monitoring of a first telecommunications circuit and second telecommunications circuit respectively. The first set of jacks 306 is further configured to provide access to test, patch, and cross-connect a first circuit. Likewise, the second set of jacks 308 is further configured to simultaneously provide access to test, patch, and cross-connect a second circuit. Accordingly, the single module 120(g) through the respective jacks 310-320 may simultaneously access at least two telecommunications circuits. Jacks may be configured as any jack that is suitable for providing module access to telecommunications circuits, such as mini-WECO type jacks.

The module 120(g) includes a module interface (e.g., a module connector 304) mounted on one end of the substrate 302 and a rectangular face plate 322 having a plurality of jack apertures mounted to the other end of the substrate 302. The module connector 304 is configured to mate or engage a backplane connector such as backplane connectors 212 in FIG. 2A. Module connectors 304 may be any connectors suitable for such a connection, e.g., pin type connectors, card edge connectors and so forth. Rectangular face plate 322 is mounted on the opposite end of the substrate 302 such that the plurality of jacks 310-320 is arranged to be accessible via the jack apertures in the face plate 322.

As previously described, module 120(g) includes two sets 306, 308 of jacks each having an input, an output and a monitor. The jacks 310-320 are coupled to one end of the substrate 302 across an axis of the substrate 302 such that the monitor jack 310 of one set 306 is nearest one edge, the monitor jack 320 of the other set 308 is nearest another edge and the remaining jacks 312 through 318 are arranged in between the two monitor jacks. Naturally, other arrangements of the jacks 310-320 are also contemplated.

The module 120(g) also includes an LED light 324 that is integrated with the module 120(g), which may be utilized for a variety of purposes. For example, the LED light 324 may be configured for use in tracing operations. Thus, one or more of the sets 306, 308 of jacks 310-320 of module 120(g) may have an associated LED light 324.

Figure 4:
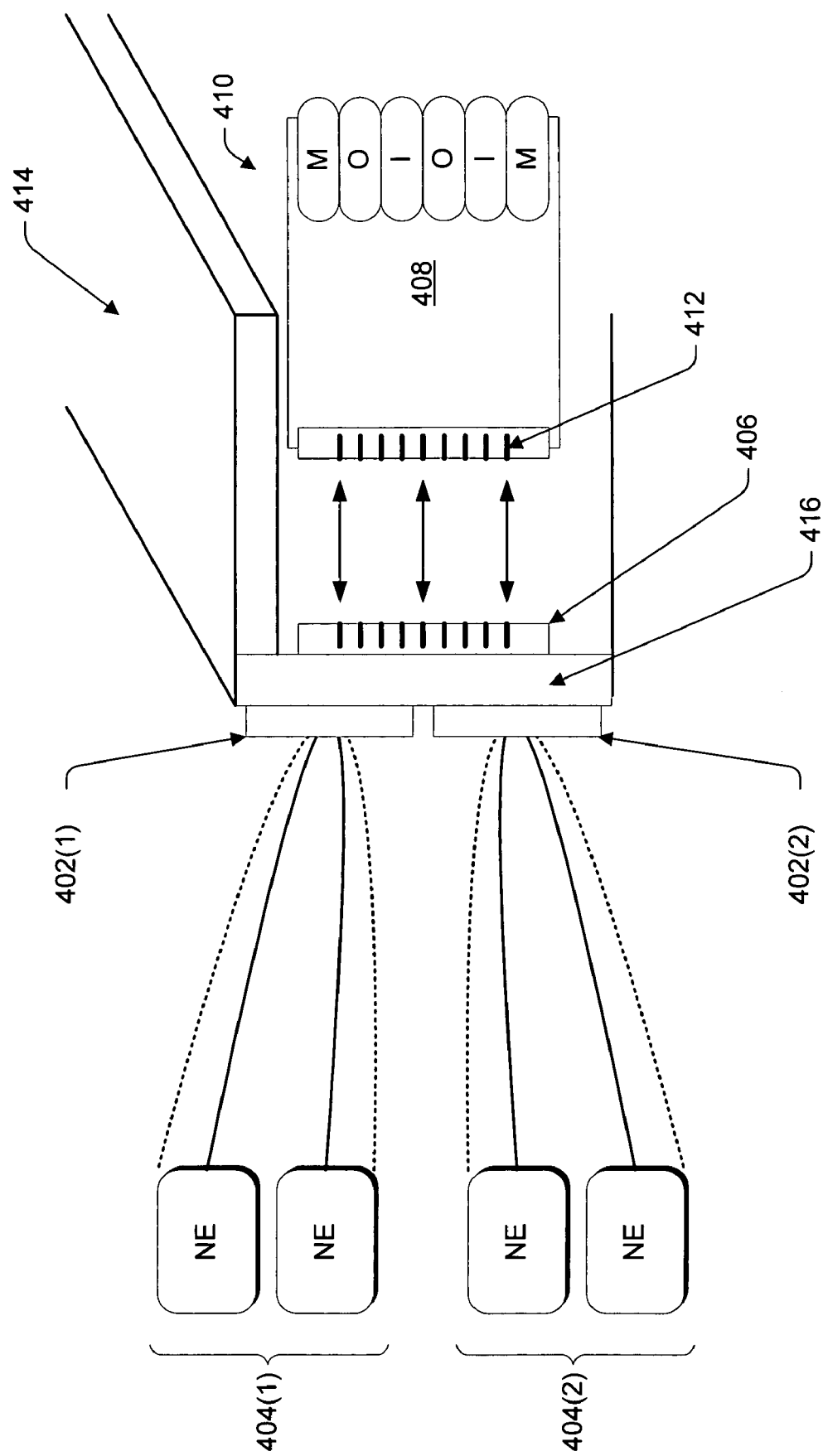
FIG. 4 is an illustration of module inserted in a chassis to access a plurality of circuits.

FIG. 4 illustrates a side view illustration of a module that is insertable into a chassis. A set of rear connectors is shown as having two subsets 402(1), 402(2). The subsets 402(1), 402(2) are configured to connect to respective circuits 404(1), 404(2). For example, subset 402(1) corresponds to circuit 404(1) and subset 402(2) corresponds to circuit 404(2).

Backplane connector 406 is communicatively coupled to the set of rear connectors, which includes both subsets 402(1) and 402(2). Module 410 is insertable such that module connector 412 engages backplane connector 406 to physically and communicatively couple the module 410 to the interface. Module 410 is configured to provide access to a plurality of telecommunications circuits. Therefore, when module 410 is coupled to backplane connector 406, it has simultaneous access to circuits 404(1), 404(2).

As illustrated in FIG. 4, module 410 may be inserted and removed from a cross-connect panel 414. Cross-connect panel 414 may be configured to provide the hot-swapping capability such that modules (e.g., module 410) may be removed and inserted while the panel is powered-up and in operation. Further, the cross-connect panel 414 may be operated without modules. According to this embodiment, the signal flow of circuits (e.g., circuits 404(1), 404(2)) is not significantly disrupted by insertion or removal of the module 410. Further, signal continuity is maintained whether or not the module 410 is present.

A backplane 416 having the backplane connector 406 may be implemented by a single printed circuit board that provides a plurality of interfaces that maintain signal continuity for each circuit connected by the rear connectors in the panel 414 without requiring connected modules. The hot-swapping capability may be provided by a single backplane printed circuit board used for each circuit in a panel having a large number of circuit connections, for example 25 or more circuit connections.

In an implementation, signal flow through the backplane 416 does not require a module 410 because the rear connectors are looped in a "pass through" configuration that maintains signal continuity when one or more of the modules are removed. The rear connectors also permit insertion of the module 410 without interrupting signals communicated via the circuits 404(1), 404(2). For example, the backplane connectors 406 and the module connectors 412 may be configured to maintain a closed circuit regardless of whether the module 410 is inserted in the chassis. Module connector 412, for instance, may be mounted on an edge of the substrate 408 and may include an edge contact connection. The backplane connector 406 may be a card edge connector with shorting contacts. The shorting contacts are closed when a module (e.g., module 410) is not present and thus the corresponding circuits 404(1), 404(2) are closed. When the module 410 is inserted, backplane connector 406 receives the module connector 412 including the edge contacts. When the edge contacts engage (e.g., contact) the shorting contacts, a closed circuit is maintained, and the module 410 may therefore provide access to the corresponding circuits 404(1), 404(2). The shorting contacts close again when the module is removed, thereby maintaining signal continuity. Thus, signals may flow through the backplane in the absence of modules and access to the signals for the purpose of patching (rerouting to other equipment) and/or monitoring of signal performance may be provided by the hot insertion or removal of a module.

In another implementation, a plurality of backplane printed circuit boards may be used, each of which provides hot-swapping capability to circuits associated with at least two access points in the panel. Returning to FIG. 2A, for example, one backplane printed circuit board may be configured to provide hot swapping capability to circuits corresponding to access point 216(4) and at least one adjacent access point. Another backplane printed circuit board may configured to provide hot swapping capability to circuits corresponding to access point 216(19) and at least one adjacent access point. The plurality of backplane printed circuit boards may together provide for hot swapping capability for each of the access points in the chassis 202.

In yet another implementation, one or more access points may be included that do not have hot swapping capability. This may be accomplished by using separate backplane printed circuit boards for non-swappable access points, using different connectors on a single backplane, and so on. This may be useful for a variety of reasons, such as to prevent certain modules from being removed on the fly, while still allowing hot-swapping of additional modules.

Figure 5A:
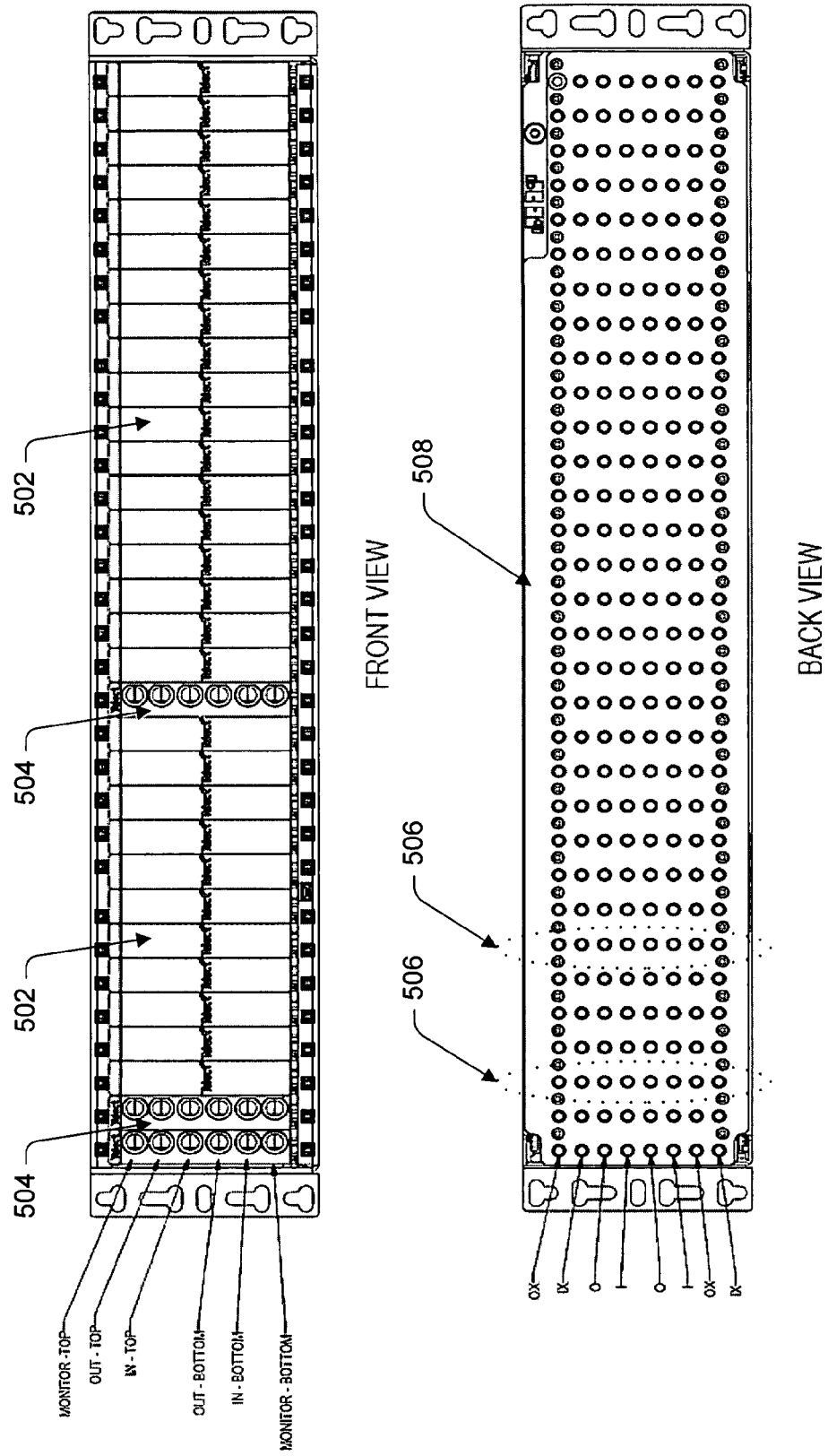
FIG. 5A is a front and back view of a panel in an exemplary embodiment of a telecommunication panel.
Figure 5B:
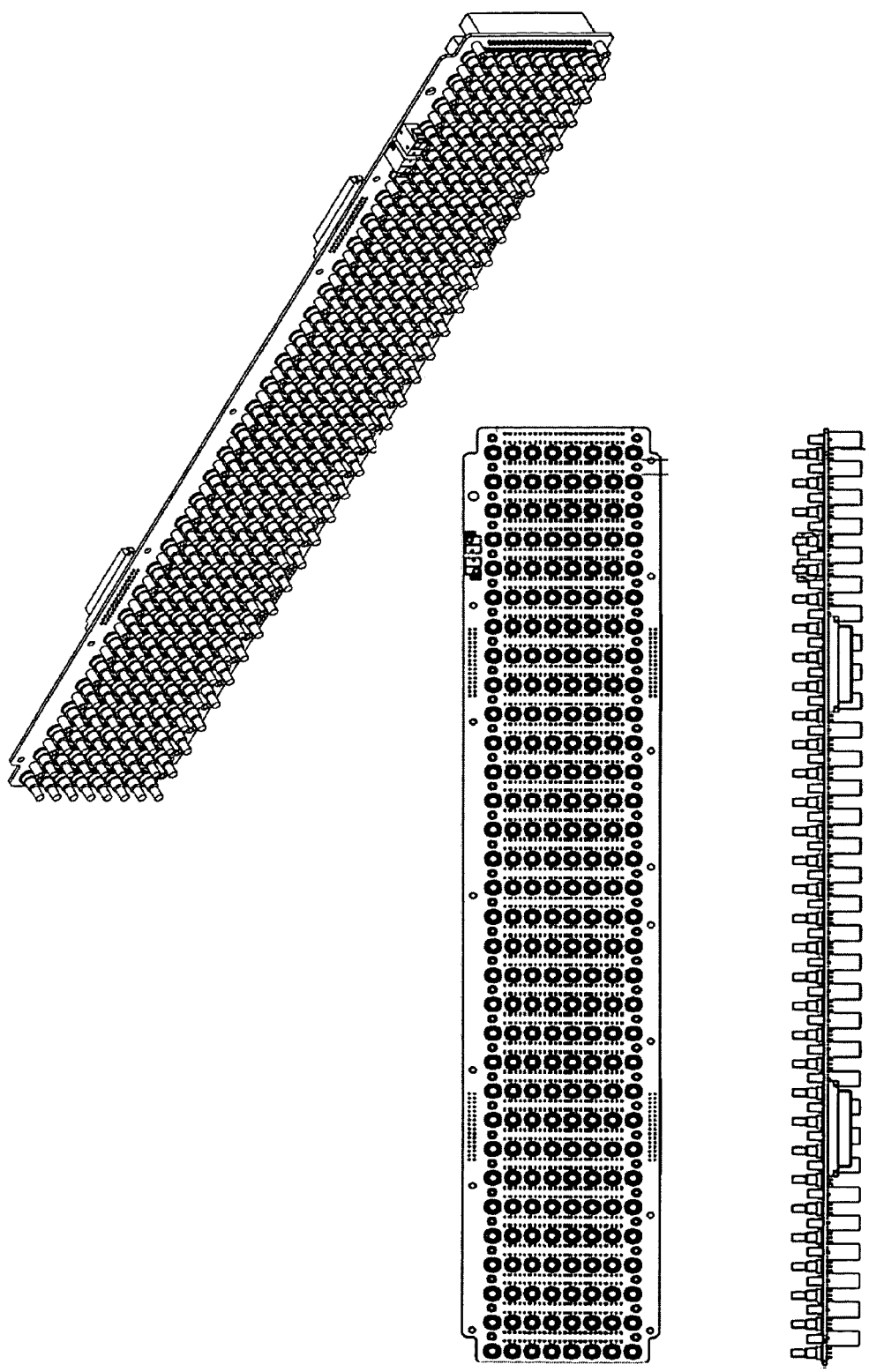
FIG. 5B is an illustration of an en exemplary embodiment of a backplane printed circuit board.

FIG. 5A illustrates a front and back view of an exemplary embodiment of a telecommunications panel according to the present invention. The panel depicted in FIG. 5A has a plurality of access slots 502 on the front of the panel to receive modules 504. Each access slot 502 has a corresponding set of rear connectors 506 on the back of the panel connected to a backplane printed circuit board 508. FIG. 5B provides a diagram showing another view of an exemplary backplane printed circuit board such as backplane printed circuit board 508 of FIG. 5A in greater detail.

As shown in FIG. 5A, the rear connectors are arranged in columns of 8 across the back of the panel. Each set of rear connectors 506 includes two subsets of connectors to connect to a single telecommunications circuit. 32 sets of rear connectors 506 are shown, corresponding to the 32 access points 502 on the front of the panel. Each set of rear connectors 506 may provide access to two circuits. Accordingly, the panel depicted in FIG. 5 may provide access to a total of 64 circuits. It is noted that the panel circuit density may vary and greater density may be desirable. Accordingly, panels and backplanes may be configured to provide sets of rear connectors for access to two or more circuits. In an implementation, panels may be configured to provide access to between 2 and 128 circuits. In another implementation, panels may be configured to provide access to greater than 24 circuits in standard size equipment racks, which cannot be obtained utilizing current techniques. Use of the techniques described herein may also provide access to more than 128 circuits.

Previous limits on the circuit density of backplanes and cross connect panels due to corresponding module size, circuit board design, and connector configurations relative to enclosure or rack sizes (e.g., standard size nineteen inch and 23 inch racks) may be overcome using the modules, backplanes and techniques described herein. For example, circuit density greater than 24 circuits in a chassis designed for a nineteen inch rack size may be attained utilizing the described techniques. The techniques may also be employed to provide higher circuit density backplanes that allow for hot swapping of modules (in and out of a panel) and may operate with the modules removed, in any standard, custom, or non-standard enclosure or rack size.

Figure 6:
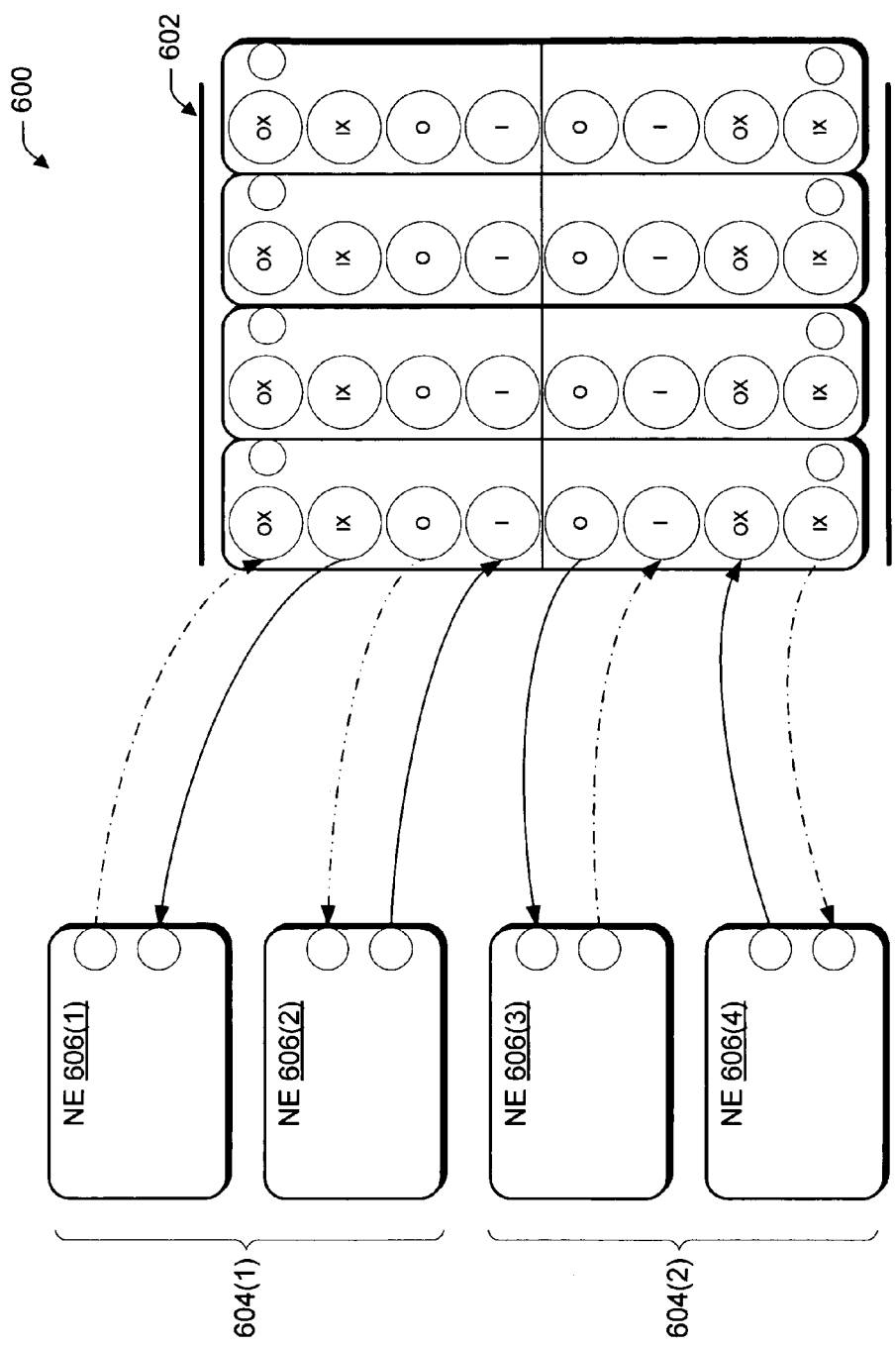
FIG. 6 is an illustration of telecommunications circuits formed at an exemplary panel.
Figure 7:
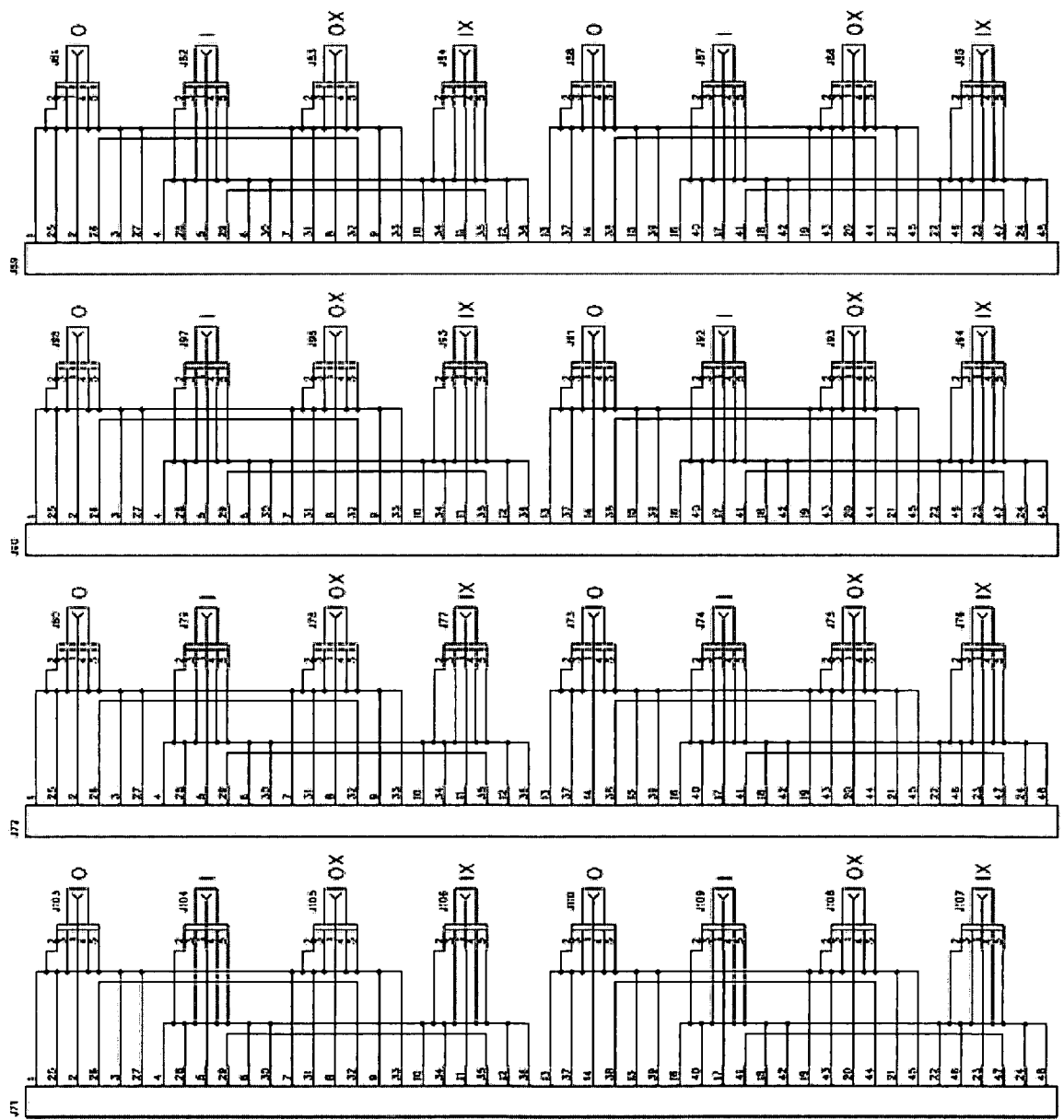
FIG. 7 is a schematic wiring diagram of an exemplary embodiment of sets of rear connectors on a backplane.
Figure 8:
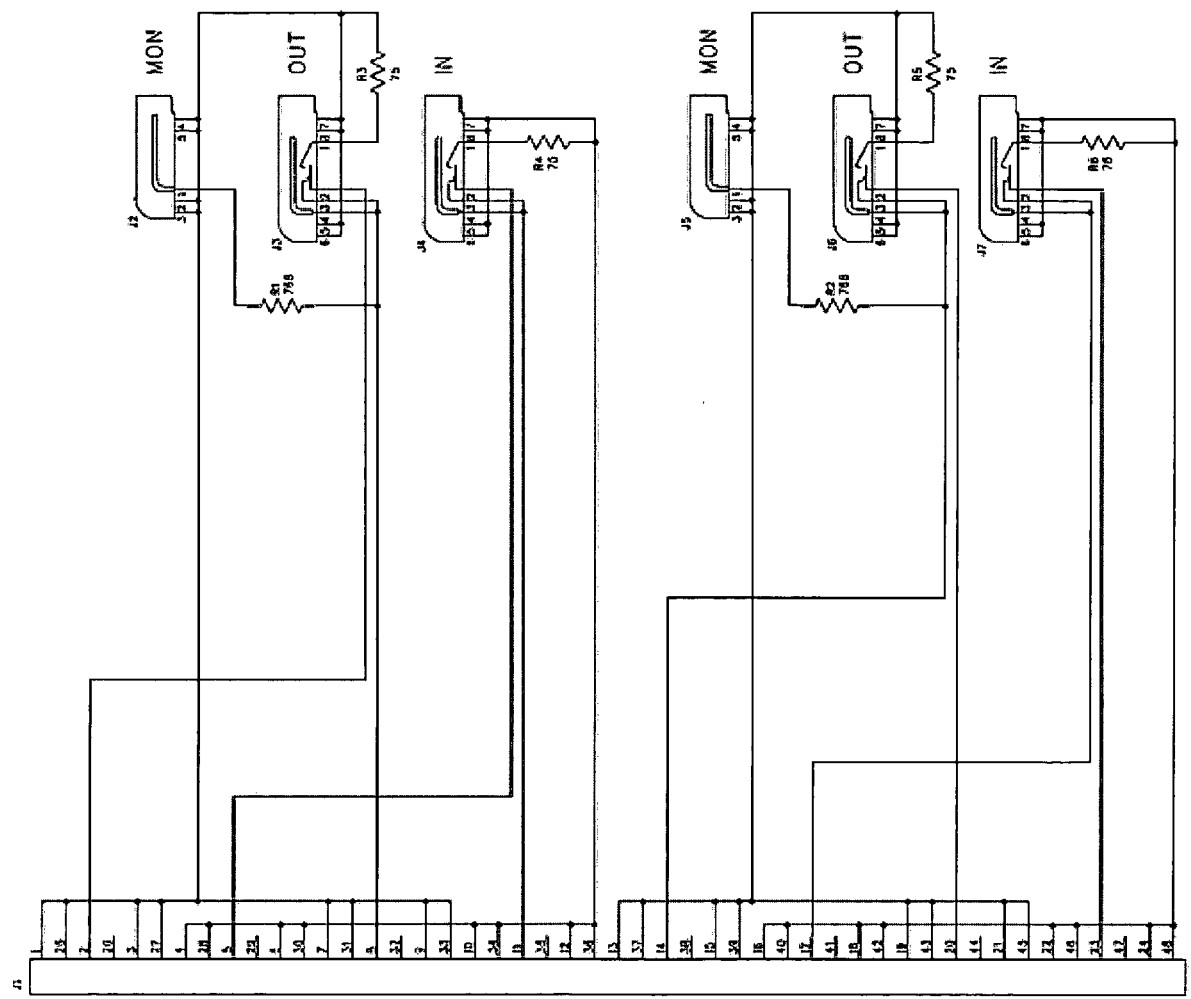
FIG. 8 is schematic wiring diagram of an exemplary embodiment of a module having a plurality of jacks to access a plurality of circuits.

FIG. 6 shows connection of circuits to the rear connectors in a exemplary embodiment of a telecommunications panel 600 according to the present invention A portion of the telecommunications panel 600 is depicted which has four sets of rear connectors arranged in columns. Each set has eight individual connectors. In this particular embodiment, there are two subsets of four connectors in each set of rear connectors. The subsets each have an output cross (OX) input cross (IX), output (O) and input (I). Each subset may connect a corresponding circuit. For example, in FIG. 6 one subset in the first of the sets of rear connectors is depicted connecting to circuit 604(1). The other subset of rear connectors is depicted as connecting to circuit 604(2). Likewise, each set of rear connectors may connect to at least two circuits. As described, a module that is configured to provide access to a plurality of circuits simultaneously, such as module 120(g), may be inserted at an access point (e.g., a slot) corresponding to a set of rear connectors. Thus, a module inserted in an access point corresponding to the set of rear connectors connecting circuits 604(1) and 604(2) may provide simultaneous access to both circuits. FIG. 7 and FIG. 8 are schematic wiring diagrams of the rear connectors and module jacks respectively.

Exemplary Procedures

The following discussion describes methods of making the modules described within. The procedures are shown as a set of blocks that specify operations performed and are not necessarily limited to the orders shown for performing the operations by the respective blocks. It should also be noted that the following exemplary procedures may be implemented in a wide variety of environments without departing from the spirit and scope thereof.

Figure 9:
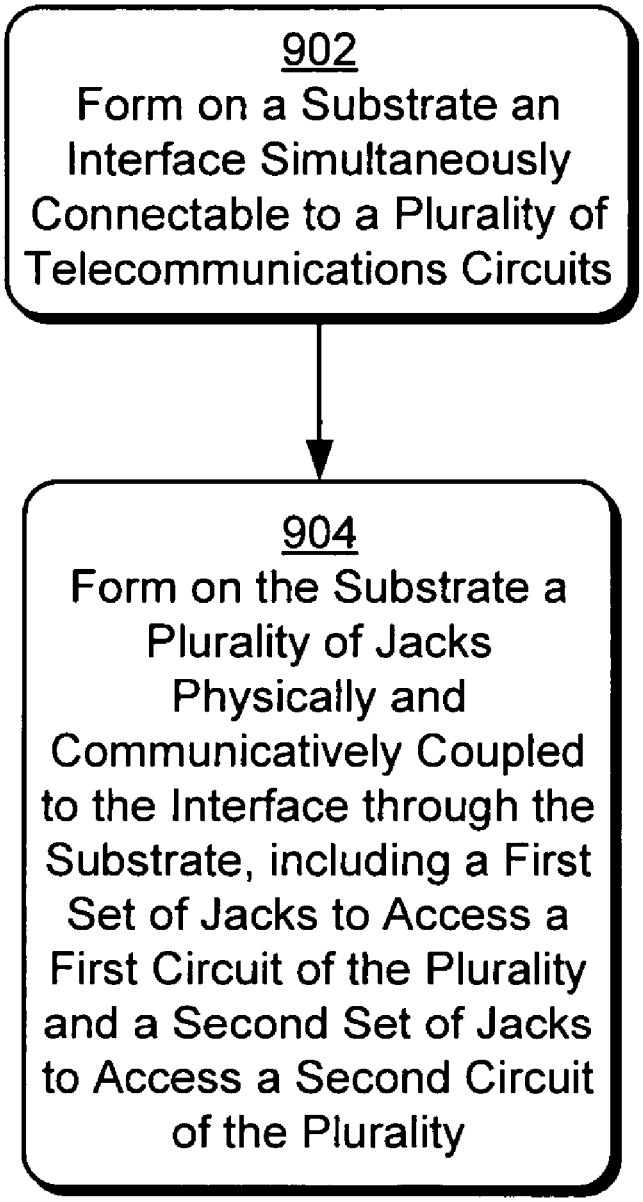
FIG. 9 is a flow diagram depicting a procedure in an exemplary implementation showing the forming of a telecommunications module.

FIG. 9 is a flow diagram depicting a procedure 900 in an exemplary implementation in which a module is formed to access a plurality of circuits in a telecommunications network. An interface connectable to a plurality of telecommunications circuits is formed on a substrate (block 902). For example, interface 304 may be formed upon substrate 302 of module 120(g) depicted in FIG. 3. Interface 304, for instance, is connectable to a plurality of circuits by insertion into a cross-connect panel 112. A plurality of jacks are formed on the substrate that are physically and communicatively coupled to the interface through the substrate, including first and second sets of jacks to access respective first and second circuits (block 904). Following the previous example, a plurality of jacks 310-320 may be formed on substrate 302 of module 120(g) depicted in FIG. 3. The plurality of jacks 310-320 includes a first and second set of jacks 306 and 308 to access first and second circuits, respectively.

Figure 10:
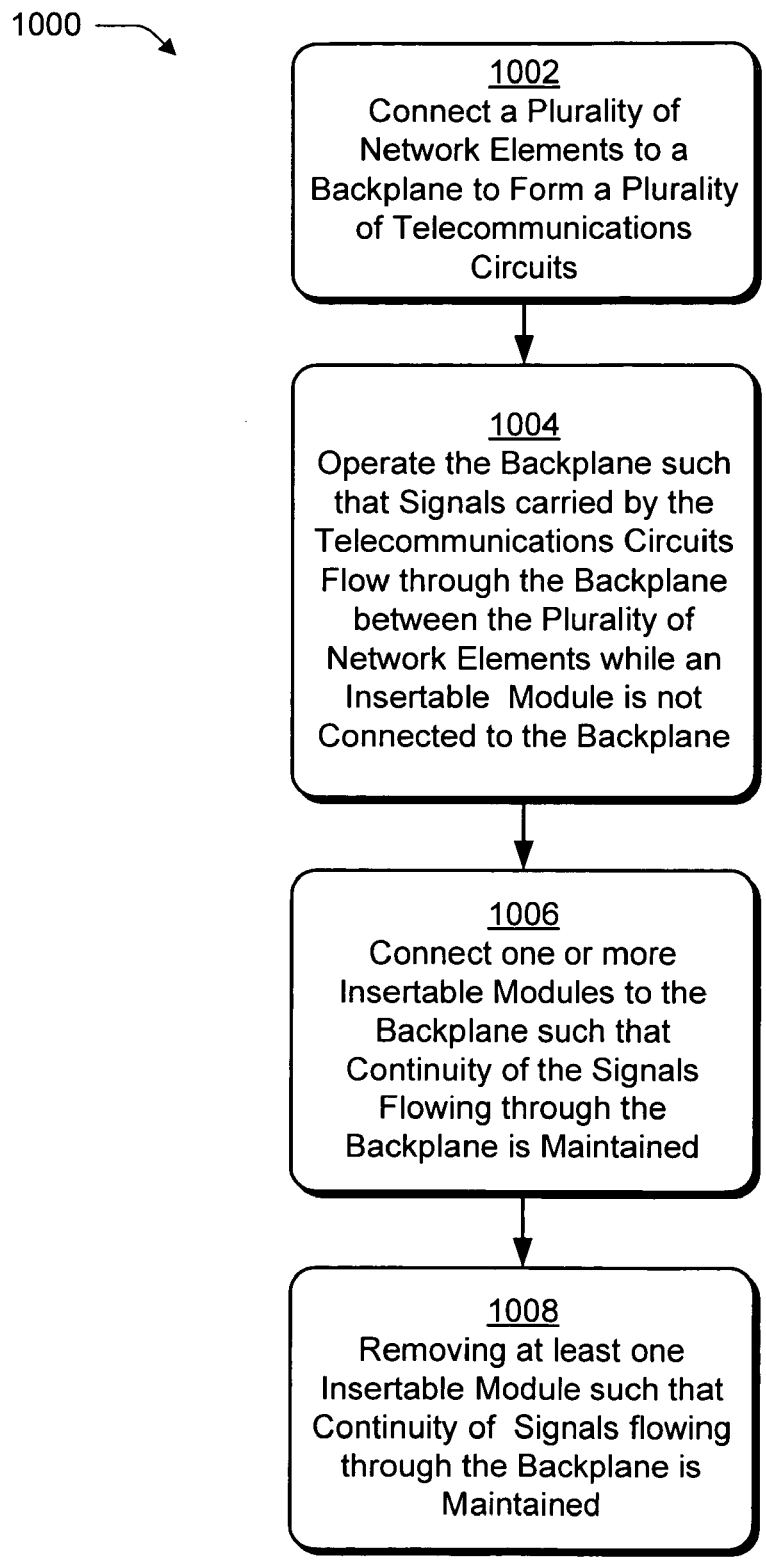
FIG. 10 is a flow diagram depicting a procedure in an exemplary implementation in which operation of a backplane in described.

FIG. 10 depicts a procedure 1000 in an exemplary implementation in which a backplane is operated to connect telecommunications circuits and enable one or more modules to access a plurality of circuits in a telecommunications network. A plurality of network elements is connected to a backplane to form a plurality of telecommunications circuits (block 1002). For example, an operator may physically connect wires from the network elements (e.g., switches, digital radios, and so on) to the backplane such that telecommunications circuits are formed between the network elements.

The backplane is then operated such that signals carried by the telecommunications circuits flow through the backplane between the network elements while an insertable module is not connected to the backplane (block 1004). For example, input and output signals from the network elements (e.g., switches, digital radios, and so on) connected to the backplane by the operator as described previously flow through the backplane. Next, one or more insertable modules are connected to the backplane such that continuity of signals flowing through the backplane is maintained (block 1006). Continuing the previous example, signals from the network elements may flow through the backplane when an insertable module (e.g., module 120(g) depicted in FIG. 3) is connected to the backplane. The continuity of signals flowing through the backplane is maintained before, during and after connection of the insertable module. Next, a module connected to the backplane is removed such that continuity of the signals flowing through the backplane is maintained (block 1008). For example, the insertable module (e.g., module 120(g) depicted in FIG. 3) connected in the previous example may be removed while signals are flowing through the backplane. Thus, the continuity of signals flowing through the backplane is maintained before, during, and after removal of the insertable module.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus, comprising:
  a substrate configured to form more than 24 telecommunications circuits and further configured to be mounted in a size 23 inches or smaller telecommunications rack;
  a plurality of rear connectors disposed upon a side of the substrate, each being connectable to a respective network element to form at least portion of a telecommunications circuit; and
  a plurality of backplane connectors disposed upon another side of the substrate, each of said backplane connectors is:
    communicatively coupled to one or more said rear connectors;
    configured to receive an insertable module that permits access to a respective said telecommunications circuit,
      wherein said insertable module comprises a printed circuit board that is directly connected to one of said backplane connectors,
      wherein signal continuity of respective said telecommunications circuits is maintained before, during and after insertion of the insertable module and before, during, and after removal of the insertable module, and
      wherein further signal continuity of respective said telecommunications circuits is maintained with or without the insertable module,
      wherein further still at least one backplane connector is an edge contact connector having shorting contacts configured to receive a corresponding module edge connector disposed on a respective said insertable module;
    operable to permit communication between the plurality of said network elements without receiving the insertable module; and
    configured to receive or remove the insertable module during operation while maintaining signal continuity.

2. An apparatus as recited in claim 1, further comprising:
  a chassis; and
  another of said substrates, wherein each said substrate is disposed within the chassis and is configured to form at least two circuits.

3. An apparatus as recited in claim 1, wherein the access permitted by each said backplane connector includes monitoring, testing, patching or cross-connecting.

4. An apparatus as in claim 1 wherein at least one said backplane connector is configured to relay at least one signal from a plurality of said telecommunication circuits.

5. A telecommunications backplane, comprising:
a printed circuit board having a plurality of interfaces, wherein each said interface is configured to:
provide access via an insertable module to a plurality of telecommunications circuits communicatively coupled to the interface,
wherein the insertable module comprises another printed circuit board that is directly connected to one of the plurality of interfaces,
wherein said backplane is configured to form more than 24 telecommunications circuits and said backplane is configured to be mounted in a size 23 inches or smaller telecommunications rack, wherein at least one interface is an edge contact connector having shorting contacts configured to receive a corresponding module edge connector disposed on a respective said insertable module; and
maintain signal continuity of respective said telecommunications circuits when the insertable module is inserted in or removed from the interface during operation, wherein signal continuity of respective said telecommunications circuits is maintained before, during and after insertion of the insertable module and before, during, and after removal of the insertable module and further wherein signal continuity of said telecommunications circuits is maintained with or without the insertable module.

6. A telecommunications backplane as recited in claim 5, wherein each of said interfaces includes a backplane connector physically and communicatively coupled through the printed circuit board to one or more rear connectors providing said communicative coupling of the plurality of telecommunications circuits to the interface.

7. A telecommunications backplane as recited in claim 5, wherein the access provided by each said interface includes monitoring, testing, patching or cross-connecting.

8. A telecommunications backplane as recited in claim 5, wherein one of said interfaces is configured to provide access to monitor one or more signals from each of the plurality of telecommunications circuits.

9. A telecommunications backplane as recited in claim 5, wherein the backplane is fully functional to connect and cross-connect the plurality of telecommunications circuits without the use of the insertable modules.

10. A telecommunications backplane as recited in claim 5, wherein:
a plurality of signals from at least one said telecommunications circuit flows thorough the backplane and is looped through at least one said interface in a pass through configuration; and
each said interface is configured to:
permit the insertable module, when connected to the interface, to access respective said signals looped through the interface; and
maintain continuity of the respective said signals when looped through the interface regardless of whether the insertable module is connected to the interface.

11. A method, comprising:
connecting a plurality of network elements to a backplane to form a plurality of telecommunications circuits, wherein said backplane is configured to form more than 24 telecommunications circuits and said backplane is configured to be mounted in a size 23 inches or smaller telecommunications rack;
operating the backplane such that signals carried by said telecommunications circuits flow through the backplane between the plurality of network elements while an insertable module is not connected to the backplane;
connecting at least one said insertable module to the backplane such that continuity of said signals flowing through the backplane is maintained during and after the connecting, wherein the connecting comprises at least one edge contact connector on the backplane having shorting contacts configured to receive a corresponding module edge connector disposed on a respective said insertable module; and
removing at least one said insertable module such that continuity of said signals flowing through the backplane is maintained during and after the removing,
wherein the connecting and removing at least one said insertable module is conducted during operation while maintaining signal continuity,
wherein the insertable module comprises a printed circuit board that is directly connected to one of the at least one edge contact connector on the backplane.

12. A method as recited in claim 11, wherein each of said insertable modules is configured to access said telecommunications circuits.

13. A method as recited in claim 12, wherein each of said modules connected to the backplane gains access to one or more signals carried by each of at least two said telecommunications circuits.

14. A method as recited in claim 11, wherein the backplane is a single printed circuit board for connecting said plurality of telecommunications circuits.

15. An apparatus, comprising:
a standard telecommunications rack in a size of 23 inches or smaller;
a single substrate configured to be mounted in said rack;
a plurality of rear connectors on one side of said single substrate, wherein each said rear connector is connectable to one of a plurality of network elements to form at least a portion of one of a more than 24 telecommunications circuits disposed on said single substrate;
a plurality of backplane connectors on the other side of said single substrate, wherein each said backplane connector is communicatively coupled to one or more said rear connectors, and each said backplane connector is configured to receive an insertable module that permits access to a respective said telecommunications circuit and is operable to permit communication between the plurality of said network elements,
wherein the insertable module comprises a printed circuit board that is directly connected to one of the plurality of backplane connectors,
wherein the plurality of backplane connectors comprises at least one edge contact connector having shorting contacts configured to receive a corresponding module edge connector disposed on a respective said insertable module,
wherein signal continuity of respective said telecommunications circuits is maintained before, during and after insertion of the insertable module and before, during, and after removal of the insertable module, and
wherein further signal continuity of respective said telecommunications circuits is maintained with or without the insertable module.

* * * * *